E. R. STILWELL.
FEED WATER PURIFIER.

No. 93,244. Patented Aug. 3, 1869.

Witnesses

R. T. Campbell.
J. N. Campbell.

Inventor

E. R. Stilwell.
Mason, Fenwick & Lawrence

UNITED STATES PATENT OFFICE.

EDWIN R. STILWELL, OF DAYTON, OHIO.

IMPROVEMENT IN WATER-HEATING DEVICE.

Specification forming part of Letters Patent No. 93,244, dated August 3, 1869.

*To all whom it may concern:*

Be it known that I, EDWIN R. STILWELL, of Dayton, in the county of Montgomery and State of Ohio, have invented a new and Improved Apparatus for Heating, Condensing, and Purifying Feed-Water for Steam-Boilers; and I do hereby declare that the following is a full, clear, and exact description thereof, reference being had to the accompanying drawings, making part of this specification, in which—

Figure 1:
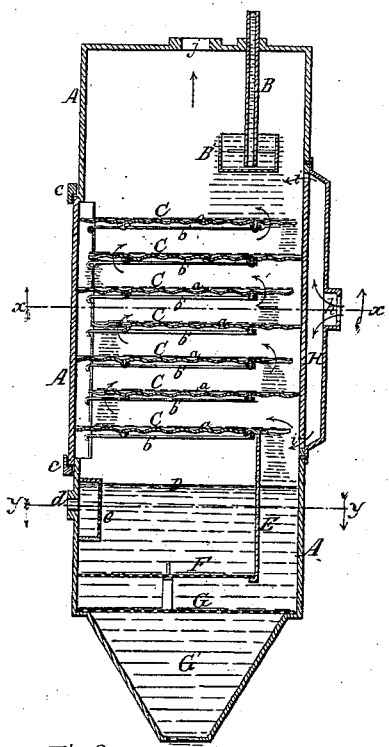
Figure 2:
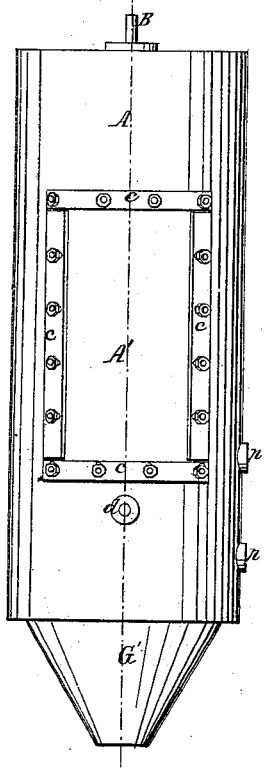
Figure 3:
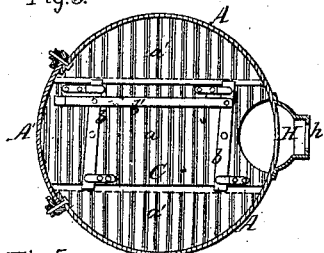
Figure 4:
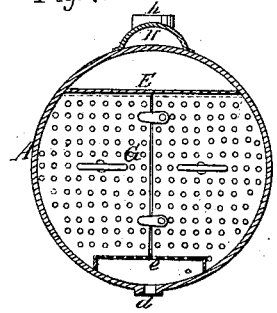
Figure 5:
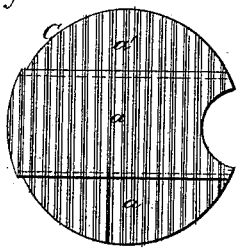

Figure 1 is a section taken diametrically through the improved apparatus. Fig. 2 is a front view of the apparatus. Fig. 3 is a section taken through Fig. 1 in the horizontal plane indicated by line $x\ x$, looking upward. Fig. 4 is a section through Fig. 1, taken in the horizontal plane indicated by line $y\ y$, looking downward. Fig. 5 is a top view of one of the shelves with its removable section.

Similar letters of reference indicate corresponding parts in the several figures.

This invention relates to certain novel improvements on apparatus which are designed for heating and purifying water for supplying steam-engines, and for other purposes for which pure water may be required.

The purification of the water is effected by subjecting it, in thin sheets, to the action of steam, thus heating the water to such a degree as will cause a deposit or precipitation of the crystallizable salts; also, by passing the water, after it has been thus heated, through a suitable filtering material for removing the floating impurities.

In the year 1861 J. S. Hooton obtained Letters Patent numbered 31,600 for a condenser and water heater, wherein a series of plates or shelves were arranged in a case in such manner as to conduct water introduced into the upper end of this case through it in a serpentine course and in thin sheets. In this case the exhaust steam from the engine was introduced for the purpose of being condensed, and also for heating the water before being carried into the boiler.

In the year 1864 Letters Patent numbered 44,561 were granted to me for a feed-water heater and filterer; and in the year 1864 said Letters Patent were reissued in two divisions, numbered, respectively, 2,159 and 2,160, for the same invention. In this patent I employed the alternating series of shelves, over which the water was caused to flow in a thin sheet, but subjected the water to the action of steam in a more advantageous manner than was done by Hooton in his apparatus patented in the year 1861. I also used a filtering contrivance, down through which the heated water was conducted; and I also used an overflow-box arranged beneath the induction-pipe for water.

I still adopt the same general arrangement of parts, but construct some of these parts differently, so as to improve the apparatus and render it more convenient and perfect in its operation.

My invention consists, first, in a series of corrugated or plain shelves, arranged within a shell, and constructed with removable sections, which will allow convenient access to be had to the interior of the shell, as will be hereinafter explained; secondly, in a novel mode of securing the man-hole door to the shell by the employment of adjustable rabbeted bars, which will allow said door to be removed or replaced without detaching said bars from the shell, as will be hereinafter explained; thirdly, in a filtering-chamber arranged below a series of alternating shelves, and so constructed that the water will be filtered by causing it to flow upwardly through the filtering medium instead of downwardly through such medium, as will be hereinafter explained; fourthly, in a mud-receptacle arranged beneath a feed-water heating and filtering apparatus, as will be hereinafter explained.

To enable others skilled in the art to understand my invention, I will describe its construction and operation.

In the accompanying drawings, A represents the shell of the heater and filter, which may be constructed cylindrical, elliptical, rectangular, or of any other form, and which may be made of iron and other suitable material.

B represents the induction water-pipe leading into case A through its top, and terminating at its inner end in an overflow-box, B'. The shelves C, over which the water is caused to flow, are arranged one above another at proper distance apart, and have openings at their ends through which the water passes from one shelf to another, as described in my Letters Patent above referred to. Each shelf consists of a central removable section, a, and two segmental or side sections, a' a', as clearly shown in Figs. 3 and 5. The side sections a' a' are permanently attached to the shell; but the intermediate section a is made so that it can be removed or replaced at pleasure.

The object of having a portion, a, of each shelf removable is that free access may be had to the interior of the shell A when the door A' is removed. The sections a may each be secured in place by means of pivoted bars b b, to which a rod, b', is pivoted for working these bars. The sections a are made wide enough to lap over the fixed sections, so that, when the pivoted bars b b are turned, as shown in Fig. 3, their ends will pass beneath the edges of the fixed sections, and thus hold the movable sections in place.

I prefer to corrugate the shelves, as shown in Figs. 1, 3, and 5, for the purpose of having them present a very large amount of surface in a comparatively small superficial area. The door A', which is applied to the shell A for the purpose of closing the opening leading therein, is held in place tightly by means of rabbeted bars c c c c, which are secured to the shell by means of bolts and nuts. The bolts pass through oblong holes made through the said bars, so that, by loosening the nuts, the bars can be moved back far enough to free the edges of the door A', thereby allowing this door to be removed.

Beneath the bottom shelf C of the series is a chamber, D, which will in practice contain any suitable material adapted for filtering and purifying water. This chamber is formed by the vertical division-plate E and a perforated bottom plate, F, and the bottom shelf G, as shown in Fig. 1, and has a passage, d, leading from it, for conducting off the purified water, which passage may have a strainer, e, applied to it, as shown in Figs. 1, 4, and 6.

Below the filtering-chamber D is a strainer, G, and below this strainer the shell A terminates in a funnel or downwardly-tapering portion, G', which forms a mud-well, and from the lower end of which sediment can be drawn off.

H represents a chamber into which steam is introduced at k, and from which the steam enters the interior of the shell at i i. The upper orifice i is arranged so that the inflowing steam strikes the stream of water falling from the overflow-vessel B' upon the first shelf C of the series of shelves, and the lower orifice i is arranged so that the inflowing steam will strike the stream of water falling from the last shelf of the series. The steam which enters the shell A through the lower orifice i ascends in a serpentine course between the series of shelves C and is condensed. The steam which enters the shell at the upper orifice i is more or less condensed, and that which is not condensed escapes through an orifice, j, at the top of the shell A.

The operation is as follows: The feed-water enters the apparatus through pipe B, falls from the box B' upon the upper shelf C, and passes to and fro over the shelves successively in the manner indicated in Fig. 1. The steam is admitted through pipe h into chamber H, and enters the shell A at the two points i i. That portion of the steam which enters at the lower point i, passes up between the shelves in an opposite direction to the flow of the water. The descending water, as it flows over and falls from one shelf to another, is met by the ascending steam and most thoroughly heated, and thereby deprived of its foreign crystallizable elements, which are deposited on the shelves C C C. That portion of the steam which is not condensed escapes from the shell at j. After the heated water flows over the lower shelf it descends, passes under the strainer F, and thence flows upwardly through the filtering-chamber D through the filtering material therein, which deprives the water of the loose matters floating in it. The purified water is then drawn off through the orifice d.

Having described my invention, what I claim as new, and desire to secure by Letters Patent, is—

1. Corrugated or plain-faced shelves C, constructed and arranged substantially as described.

2. The door A', applied to shell A by means of the adjustable bars c c and bolts and nuts, substantially as described.

3. The filtering-chamber D, constructed and arranged substantially as described.

4. The mud-well G', arranged below a filtering-chamber, D, in combination with the shelves and steam-inlets, substantially as described.

EDWIN R. STILWELL.

Witnesses:
W. E. MILLER,
CHAS. F. SNYDER.